United States Patent
Nakasu et al.

(10) Patent No.: US 11,189,035 B2
(45) Date of Patent: Nov. 30, 2021

(54) RETRIEVAL DEVICE, RETRIEVAL METHOD, AND COMPUTER PROGRAM PRODUCT

(71) Applicant: Kabushiki Kaisha Toshiba, Minato-ku (JP)

(72) Inventors: Toshiaki Nakasu, Chofu (JP); Daisuke Kobayashi, Kawasaki (JP); Kazushige Ouchi, Saitama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 15/647,312

(22) Filed: Jul. 12, 2017

(65) Prior Publication Data

US 2018/0144479 A1 May 24, 2018

(30) Foreign Application Priority Data

Nov. 18, 2016 (JP) .............................. JP2016-225214

(51) Int. Cl.
*G06K 9/00* (2006.01)
*G06T 7/20* (2017.01)
(Continued)

(52) U.S. Cl.
CPC .............. *G06T 7/20* (2013.01); *G06F 16/434* (2019.01); *G06F 16/5866* (2019.01);
(Continued)

(58) Field of Classification Search
CPC .. G06F 16/70; G06F 16/5866; G06F 16/5854; G06F 16/5862; G06F 16/40;
(Continued)

(56) References Cited

U.S. PATENT DOCUMENTS 5,892,520 A * 4/1999 Ioka ...................... G06F 16/786
345/474
6,446,060 B1 * 9/2002 Bergman ................ G06F 16/58
707/770
(Continued)

FOREIGN PATENT DOCUMENTS

EP 805405 A2 * 5/1997 ............. G06F 17/30
EP 0 805 405 A2 11/1997
(Continued)

OTHER PUBLICATIONS

Babaguchi, Noboru, Yoshihiko Kawai, and Tadahiro Kitahashi. "Event based indexing of broadcasted sports video by intermodal collaboration." IEEE transactions on Multimedia 4.1 (2002): 68-75.*
(Continued)

*Primary Examiner* — Avinash Yentrapati
(74) *Attorney, Agent, or Firm* — Oblon, McClelland, Maier & Neustadt, L.L.P.

(57) ABSTRACT

A retrieval device includes one or more processors. The processors acquire trajectory information indicating a movement trajectory of a target in time-series images. The processors acquire situation information indicating a peripheral situation of the target in the time-series images. The processors acquire a retrieval query containing a movement trajectory and a peripheral situation. The processors retrieve an image matching with the retrieval query among images contained in the time-series images based on the trajectory information and the situation information.

16 Claims, 9 Drawing Sheets

(51) Int. Cl.
*G06F 16/432* (2019.01)
*G06F 16/58* (2019.01)
*G06F 16/783* (2019.01)

(52) U.S. Cl.
CPC .......... *G06F 16/784* (2019.01); *G06F 16/786* (2019.01); *G06F 16/7834* (2019.01); *G06F 16/7837* (2019.01); *G06K 9/00771* (2013.01)

(58) Field of Classification Search
CPC ...... G06F 16/51; G06F 16/434; G06F 16/784; G06F 16/7834; G06F 16/7837; G06F 16/786; G06T 7/20; G06K 9/00771
See application file for complete search history.

(56) References Cited

U.S. PATENT DOCUMENTS

| | | | |
|---|---|---|---|
| 10,706,094 B2* | 7/2020 | Raichelgauz | G06F 16/40 |
| 2006/0221357 A1* | 10/2006 | Uzawa | G06K 9/00483 |
| | | | 358/1.1 |

FOREIGN PATENT DOCUMENTS

| | | |
|---|---|---|
| JP | 5-108730 | 4/1993 |
| JP | 2018-72939 A | 10/2018 |
| WO | WO 2013/166456 A2 | 11/2013 |
| WO | WO 2015/190071 A1 | 12/2015 |

OTHER PUBLICATIONS

Yildirim, Yakup, and Adnan Yazici. "Ontology-supported video modeling and retrieval." International Workshop on Adaptive Multimedia Retrieval. Springer, Berlin, Heidelberg, 2006. (Year: 2006).*

A. H. R. Albers, et al., "Smart Search & Retrieval on Video Databases", Consumer Electronics, XP010896711, Jan. 7, 2006. pp. 475-476.

Akihiro Sekura, et al., "Video Retrieval System Using Handwriting Sketch", MVA2009 IAPR Conference on Machine Vision Applications, XP055441115, May 22, 2009, pp. 283-286.

* cited by examiner

RETRIEVAL DEVICE, RETRIEVAL METHOD, AND COMPUTER PROGRAM PRODUCT

CROSS-REFERENCE TO RELATED APPLICATIONS

This application is based upon and claims the benefit of priority from Japanese Patent Application No. 2016-225214, filed on Nov. 18, 2016; the entire contents of which are incorporated herein by reference.

FIELD

Embodiments described herein relate generally to a retrieval device, a retrieval method, and a computer program product.

BACKGROUND

There are needs for retrieval of a scene in a specific time band from a video image. For example, a scene in a specific time band is retrieved from monitoring images shot by a monitoring camera in a station, a building, or the like to be used for inspection in safety management or criminal investigation. As another example, a specific scene retrieved from a video image of a sport game to be used for analysis in order to strengthen a team.

For example, a technique in which tags of "try", "scrum", and the like are attached to a video image of a game and a try scene and the like are retrieved on the basis of the tags and a technique in which a scene is intuitively retrieved on the basis of movement trajectories of objects (ball, players, and the like) have been known. Furthermore, a technique in which the objects are detected from a video image of a game to analyze play has been known.

The conventional techniques cannot however retrieve desired scenes appropriately in some cases. Scenes in accordance with situations cannot be retrieved, for example, only on the basis of the movement trajectories in some cases.

BRIEF DESCRIPTION OF THE DRAWINGS

FIG. 1.5 is a diagram illustrating still another example of the retrieval query input method;

DETAILED DESCRIPTION

According to one embodiment, a retrieval device includes one or more processors. The processors acquire trajectory information indicating a movement trajectory of a target in time-series images. The processors acquire situation information indicating a peripheral situation of the target in the time-series images. The processors acquire a retrieval query containing a movement trajectory and a peripheral situation. The processors retrieve an image matching with the retrieval query among images contained in the time-series images based on the trajectory information and the situation information.

Hereinafter, a preferable embodiment of a retrieval device according to the present invention will be described in detail with reference to the accompanying drawings.

The retrieval device in the embodiment retrieves a desired image (scene) from time-series images using, as a retrieval query, a movement trajectory of a target (object) and a peripheral situation (offense and defense situation, position of a crowded region, or the like) of the target that are contained in the time-series images.

The time-series images are a plurality of images aligned in time series. The time-series images are, for example, a moving image (video image) containing frame images shot with predetermined time intervals. As described above, a video image provided by shooting a game of a sport, monitoring images shot by a monitoring camera, and the like can be the time-series images. The time-series images are not limited thereto.

Figure 1:
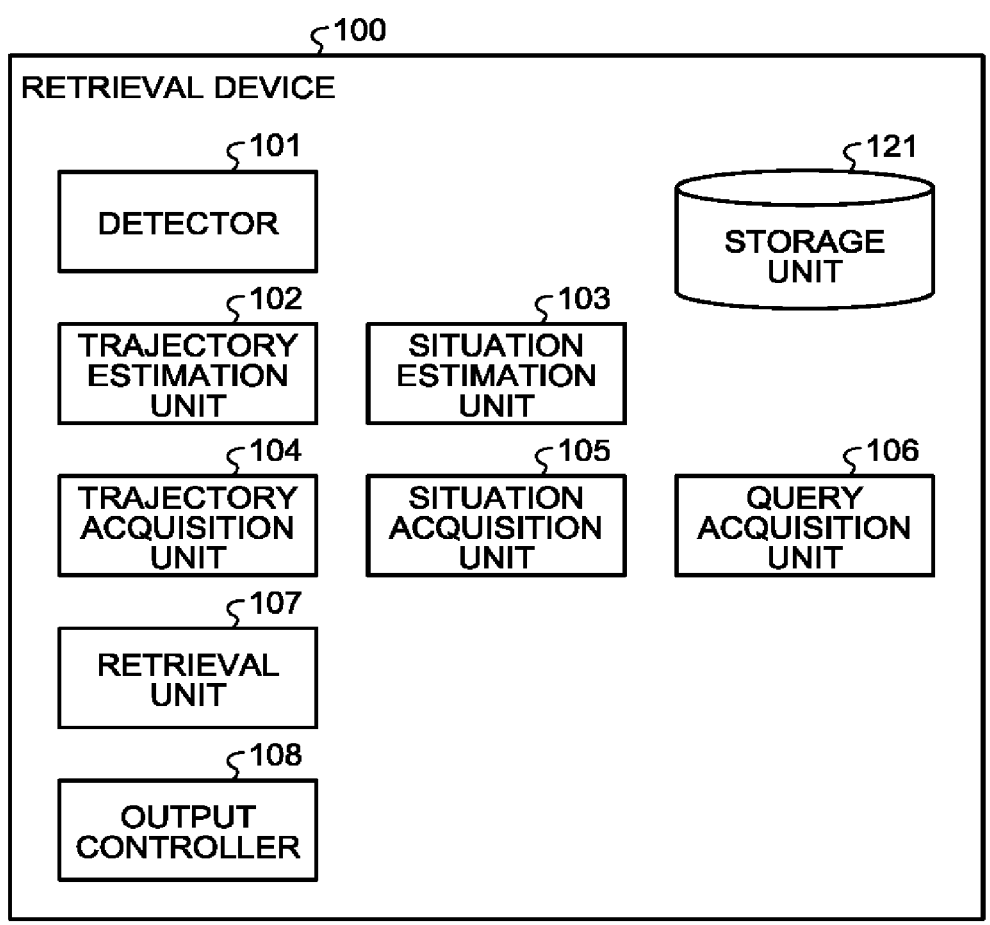
FIG. 1 is a block diagram of a retrieval device according to an embodiment.

FIG. 1 is a block diagram illustrating an example of the configuration of a retrieval device 100 in the embodiment. As illustrated in FIG. 1, the retrieval device 100 includes a detector 101, a trajectory estimation unit 102, a situation estimation unit 103, a trajectory acquisition unit 104, a situation acquisition unit 105, a query acquisition unit 106, a retrieval unit 107, an output controller 108, and a storage unit 12.

The detector 101 detects object and positions of the object from the time-series images. The detector 101 detects the object from the images by, for example, comparing the learned feature of the object and the feature acquired from the images. A method for detecting the object from the images is not limited thereto and various detection methods that have been conventionally used can be applied. The detector 101 may detect the object and the positions of the object from the images using, for example, a method described in WO No. 2015/190071.

It is sufficient that the object to be detected is appropriately determined in accordance with applications. For example, a person, a gathering of a plurality of persons, a region in which a plurality of persons gather, or the like can be detected as the object. From a video image provided by shooting a ball game, a person such as a player of each team and a referee and a region in which a plurality of persons gather, such as a maul in rugby, can be detected as the object.

The trajectory estimation unit 102 estimates the movement trajectory of the object in the time-series images on the basis of the detected positions. As the method for estimating the movement trajectory, various methods that have been conventionally used can be applied. The trajectory estimation unit 102 can estimate the movement trajectory of the object by, for example, a method for estimating the movement trajectory on the basis of the detected time-series positions of the object or a method using optical flow as described in WO No. 2015/190071.

The trajectory estimation unit 102 outputs trajectory information indicating the estimated movement trajectory. The trajectory information contains, for example, information (object identification information) for identifying the object the movement trajectory of which has been estimated, pieces of information (image identification information) for identifying images from which the object has been detected among the time-series images, pieces of information indicating the positions of the object, and information indicating the position of the movement trajectory. The pieces of information for identifying the images are, for example, information for specifying the movement start time and information for specifying the movement end time. The data structure of the trajectory information is not limited thereto.

The situation estimation unit 103 estimates the peripheral situations of the object from the time-series images. The situation estimation unit 103 estimates, as the peripheral situation, the presence of another object that is different from the object the movement trajectory of which is estimated, a position of another object, or the like. The position of another object, or the like, can be estimated by the same method as that by the detector 101. The peripheral situation is not limited thereto. The situation estimation unit 103 may estimate, as the peripheral situation, a team holding a ball, a type of play (skill) that is executed in the ball game, or the like from the video image provided by shooting the ball game.

The situation estimation unit 103 may recognize the peripheral situation by recognizing a sound environment corresponding to the time-series images. The sound environment is provided by, for example, analyzing sound contained in the video image and sound acquired independently of the video image. As the analysis method, a method in which the volume thereof is simply detected, a method in which sound types are classified using machine learning, or the like can be applied. For example, information related to sound, such as noisiness, quietness, cheering, blowing of a whistle, and speech by a specific person, can be estimated as the peripheral situation. Alternatively, the peripheral situation may be estimated from text information provided as a result of speech recognition. The situation estimation unit 103 stores a relation between sound analysis results and the images in the storage unit 121 or the like.

The situation estimation unit 103 may estimate information related to a place at which the target is present as the peripheral situation.

It should be noted that when the ball is hidden in a region in which the players crowd and so on, the position of the ball cannot be detected and the team holding the ball cannot be estimated in some cases. In such a case, the situation estimation unit 103 may estimate that the peripheral situation of the object is unknown. The situation estimation unit 103 may estimate that, for example, the team holding the ball is any one of "team A", "team B", and "unknown".

It is assumed that a state of the ball contained in an image is classified into a case where the ball is fully visible, a case where the ball is hidden when a person holds the ball, and a case where the ball is hidden in a crowded region. When the ball is fully visible, the ball can be detected by a well-known object detection method. When the ball cannot be detected, it is determined that the ball is hidden by a person or in a crowded region. In this case, it is considered that a person or a crowded region in the vicinity of the ball in a previous frame hides the ball, and the person or the crowded region is traced. The state of the ball in an image of each frame can be thus estimated.

In consideration of these premises, a method for estimating the ball holding team is described. The team holding the ball cannot be determined only from the image in which the ball alone is fully visible during passing, kicking, or the like. The same holds true for the case in which the ball is hidden in the crowded region. In these oases, the ball holding team is set to "unknown".

On the other hand, when a person holds the ball, the team holding the ball can be identified on the basis of similarities between color information in the vicinity of the detection position of the person and colors of uniforms of the respective teams. In this case, the ball holding team can be estimated to be "team A" or "team B".

The state of the ball holding team is unknown in frames in which the players are away from the ball when, for example, a player of team A passes the ball to another player of team A, when the player of team A kicks the ball and the player of team A holds the ball, and so on, and it is therefore determined that the state of the ball holding team is set to "team A"→"unknown"→→"team A".

When the peripheral situation of a certain image is unknown, the situation estimation unit 103 may estimate that a peripheral situation of at least one of images before or after the image corresponds to the peripheral situation of the image. The situation estimation unit 103 may, for example, replace the ball holding team by "team A" or "team B" in a time band in which the ball holding team is "unknown", in consideration of time-series relations. When, for example, the states before and after "unknown" are the same team, the situation estimation unit 103 may estimate that the team holds the ball also in the time band of "unknown" between the states. Alternatively, "unknown" may be replaced by the state before "unknown" or the state after "unknown".

The situation estimation unit 103 outputs pieces of situation information indicating the estimated peripheral situations. The situation information contains, for example, information (situation identification information) for identifying the estimated peripheral situation and information (image identification information) for identifying an image from which the peripheral situation has been detected among the time-series images. The data structure of the situation information is not limited thereto.

It should be noted that a device other than the retrieval device 100 may estimate the movement trajectory and the peripheral situation. The movement trajectory and the peripheral situation may be, for example, analyzed in advance and stored in the storage unit 121, or pieces of information that have been added manually may be used as the information indicating the movement trajectory and the information indicating the peripheral situation. In this case, the detector 101, the trajectory estimation unit 102, and the situation estimation unit 103 are not required to be included in the retrieval device 100.

The trajectory acquisition unit 104 acquires the trajectory information output from the trajectory estimation unit 102. The trajectory acquisition unit 104 may acquire the trajectory information from another device.

The situation acquisition unit 105 acquires the situation information output from the situation estimation unit 103. The situation acquisition unit 105 may acquire the situation information from another device.

The query acquisition unit 106 acquires the retrieval query containing the movement trajectory and the peripheral situation. The query acquisition unit 106 acquires the retrieval query input through an input device such as a keyboard, a mouse, a touch panel, and a microphone. Thus, the retrieval query can be input in any format such as a character string, a symbol, and a sound. When the retrieval query is input with the sound, the query acquisition unit 106 may recognize a sound generated by a user as a character string and acquire the recognized character string as the retrieval query. When, for example, a mode of "retrieval of ambient sound" is specified, the query acquisition unit 106 may input, as the retrieval query, the sound that is retrieved as it is through the microphone. A method for acquiring the retrieval query is not limited thereto and any method can be applied. The query acquisition unit 106 may acquire a retrieval query transmitted from another device through a network or the like.

The retrieval unit 107 retrieves an image that matches with the retrieval query among the images contained in the time-series images on the basis of the retrieval query, the trajectory information, and the situation information. The retrieval unit 107 retrieves an image having the movement trajectory indicated by the trajectory information that matches with the movement trajectory contained in the retrieval query and the peripheral situation indicated by the situation information that matches with the peripheral situation contained in the retrieval query from the images at the respective time points that are contained in the time-series images. When the sound is used as the retrieval query, the retrieval unit lei retrieves a matching image by, for example, comparing the sound input as the retrieval query and the sound contained in the video image with each other.

A match of the movement trajectories may include not only the case in which the movement trajectories completely match with each other but also the case in which the matching degree (similarity) between the movement trajectories is equal to or higher than a threshold and the case in which a part in the movement trajectory matches with the movement trajectory contained in the retrieval query. Whether the movement trajectories match with each other can be determined using the following methods.

(1) Sampling points (two or more points including a tart point and an end point) are set at a predetermined interval on the movement trajectory and a histogram is created on the basis of sub movement trajectory directions (for example, approximate to any of up, down, left, and right directions) between the adjacent sampling points. For example, values of "up", "down", "left", and "right" in the histogram may be calculated by totaling distances of the sub movement trajectories determined to be in the respective directions. The movement trajectories may be determined to match with each other when a Bhattacharyya distance between the histograms thereof is equal to or lower than a predetermined threshold.

(2) A drawing area (that may be identical to a court region) set in advance is divided into a plurality of blocks (for example, two blocks in the longitudinal direction×four blocks in the transverse direction), and the movement trajectory passing through blocks the order f which is identical to the order of blocks through which the movement trajectory contained in the retrieval query passes may be extracted.

(3) The histograms that are the same as that in the above-mentioned (1) are created for the respective blocks through which the movement trajectories pass in the above-mentioned (2). Then, the movement trajectories passing through the same blocks and having the distance between the histograms for the blocks that is equal to or less than the predetermined threshold may be determined to match with each other.

A match of the peripheral situations may include not only the case in which the situations are completely identical to each other but also the case in which a plurality of situations are similar to each other and the case in which one of the situations encompasses the other thereof.

The retrieval unit 107 may first narrow down the retrieval target images through one of the movement trajectory and the peripheral situation contained in the retrieval query, and then, retrieve a further matching image through the other thereof. For example, the retrieval unit 107 may retrieve an image having the movement trajectory indicated by the corresponding trajectory information that matches with the movement trajectory contained in the retrieval query from images (first images) having the peripheral situations indicated by the pieces of corresponding situation information that match with the peripheral situation contained in the retrieval query among the images contained in the time-series images.

The output controller 108 controls output of results of various pieces of processing that the retrieval device 100 executes. For example, the output controller 108 outputs a retrieval result by the retrieval unit 107 to a display device such as a display. The display device may be included in the retrieval device 100 or in a device other than the retrieval device 100. An output method is not limited to the method in which the retrieval result is displayed on the display device, and a method in which it is transmitted through a network or the like, a method in which it is output to a recording medium, or another method may be applied.

The storage unit 121 stores therein the various pieces of information that the retrieval device 100 uses for executing the various pieces of processing. The storage unit 121 stores therein, for example, the video image as the retrieval target, the estimated trajectory information and situation information, the trajectory information and situation information transmitted from another device, and the like. The storage unit 121 can be configured by various storage media that are commonly used, such as a hard disk drive (HDD), an optical disk, a memory card, and a random access memory (RAM).

The detector 101, the trajectory estimation unit 102, the situation estimation unit 103, the trajectory acquisition unit 104, the situation acquisition unit 105, the query acquisition unit 106, the retrieval unit 107, and the output controller 108 may be implemented by causing one or more processing devices (processors) such as a central processing unit (CPU) to execute a computer program, that is, by software, by hardware (processor) such as one or more integrated circuits (IC), or by combining software and hardware, for example.

The retrieval device 100 can be configured by, for example, a single device such as a common personal computer. The retrieval device 100 may be implemented as a server device that executes retrieval processing in response to a retrieval request from a terminal device such as a personal computer and a mobile terminal. The server device may be physically configured by one device or may be implemented by a virtual device on a cloud computing environment.

Figure 2:
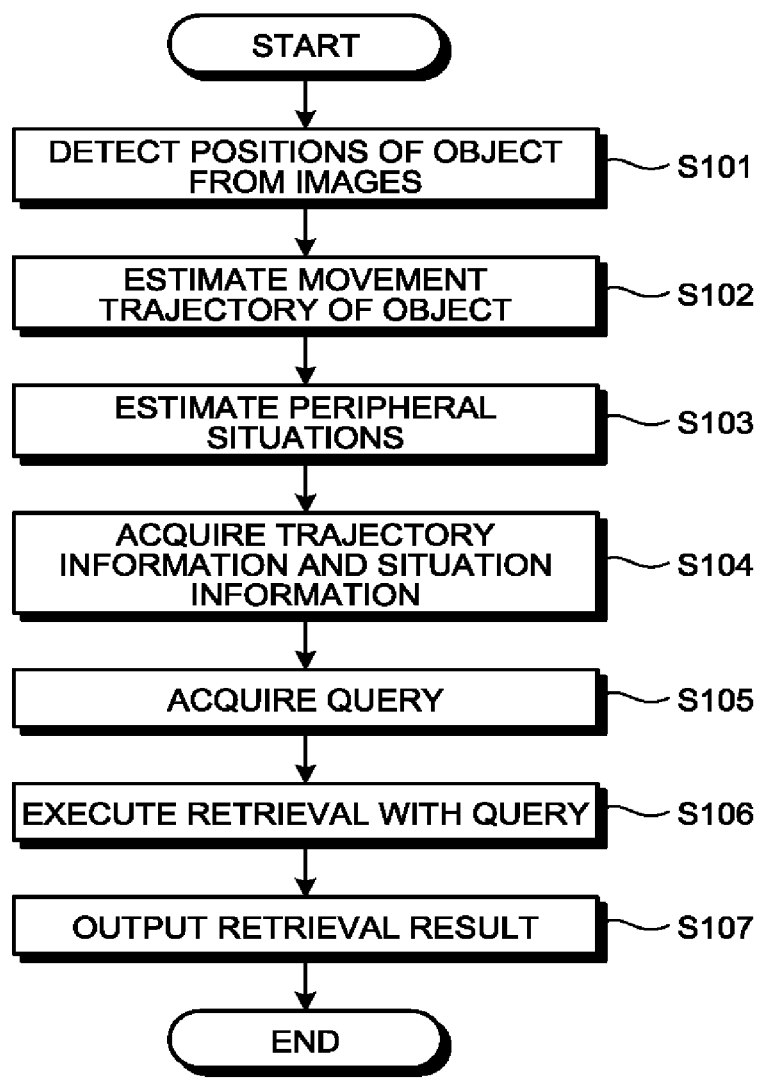
FIG. 2 is a flowchart of retrieval processing in the embodiment.

Next, the retrieval processing by the retrieval device 100 in the embodiment that is configured as described above will be described with reference to FIG. 2. FIG. 2 is a flowchart illustrating an example of the retrieval processing in the embodiment.

The detector 101 detects positions of an object such as a ball and a person from time-series images (step S101). The time-series images may be acquired in advance and stored in the storage unit 121 or the like, or may be input in real time by broadcasting, streaming, or the like.

The trajectory estimation unit 102 estimates a movement trajectory of the object on the basis of the positions detected by the detector 101 (step S102). The situation estimation unit 103 estimates peripheral situations of the object from the time-series images (step S103). Trajectory information indicating the estimated movement trajectory and situation information indicating the estimated peripheral situations may be stored in the storage unit 121 or the like.

When a device other than the retrieval device 100 estimates the movement trajectory and the like, the pieces of processing from step S101 to step S103 may be executed in another device.

Then, the trajectory acquisition unit 104 acquires the trajectory information and the situation acquisition unit 105 acquires the situation information (step S104). The query acquisition unit 106 acquires a retrieval query (step S105). It is sufficient that the retrieval query is acquired before execution of retrieval. The query acquisition unit 106 may acquire the retrieval query, for example, before the start of the processing at step S101.

The retrieval unit 107 executes retrieval with the retrieval query (step S106). The output controller 108 outputs a retrieval result by the retrieval unit 107 (step S107).

Figure 3:
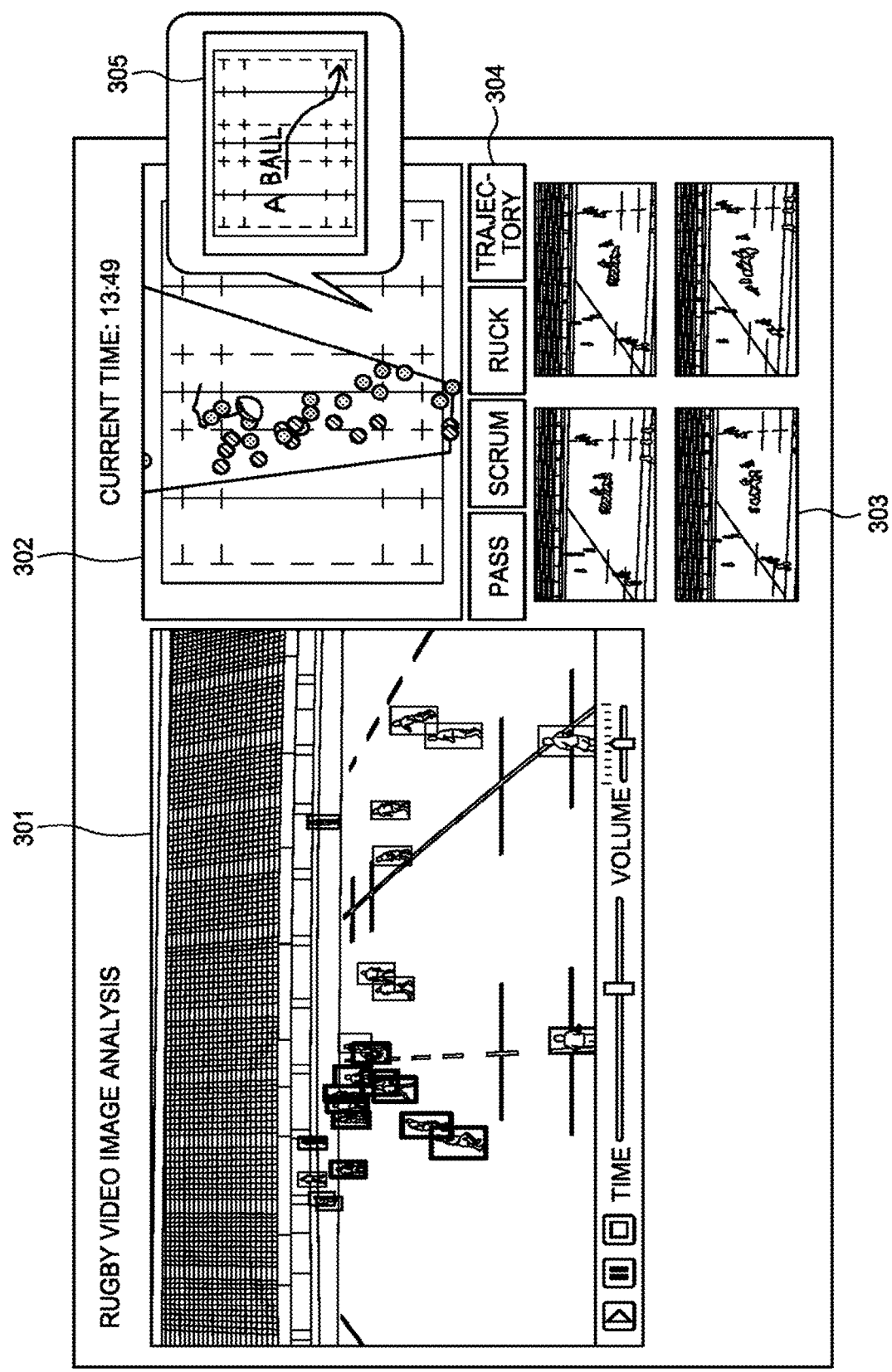
FIG. 3 is a diagram illustrating an example of a retrieval screen for executing the retrieval processing.

Next, a specific example of the retrieval processing by the retrieval device 100 is described. FIG. 3 is a diagram illustrating an example of a retrieval screen for executing the retrieval processing. FIG. 3 illustrates an example in which a video image provided by shooting a rugby game is analyzed and displayed. The retrieval processing may be applied to analysis of video images of ball games other than rugby and sports other than ball games.

As illustrated in FIG. 3, the retrieval screen contains a reproduction region 301, an object display region 302, a thumbnail display region 303, and a trajectory button 304.

The reproduction region 301 is a region in which the video image is reproduced and displayed. The object display region 302 is a region in which detected objects are displayed. In the example of FIG. 3, the object display region 302 is used for indicating positions of the objects on a two-dimensional plane (field for the rugby). In this case, the detector 101 may be configured, for example, so as to detect the positions of the objects on a predetermined plane. The object display region 302 may be configured so as to indicate the positions of the objects in a three-dimensional space.

The output controller 108, for example, synthesizes the objects such as players of respective teams, a ball, and a crowded region, and the position of a movement trajectory of the ball from the past time a predetermined time before the current time with the video image displayed in the reproduction region 301 and displays it in the object display region 302.

The output controller 108 may change a display mode of the respective objects and the peripheral situations in accordance with types of the objects and the peripheral situations for display. The output controller 108, for example, may display the players belonging to the same teams in states of being surrounded by rectangles of the same colors in the reproduction region 301, and may display the players belonging to the same teams with icons of the same colors in the object display region 302. When the ball is fully visible, the output controller 108 may display the ball in a state of being surrounded by a rectangle of the color corresponding to the ball holding team.

The thumbnail display region 303 is a region in which thumbnails of partial scenes (images) of the video image are displayed. For example, the thumbnails of the images retrieved by the retrieval processing are displayed in the thumbnail display region 303. When, for example, a button corresponding to a play type such as "pass", "scrum", and "ruck" is pressed, the output controller 108 may display candidates of scenes (images) matching with the play corresponding to the pressed button in the thumbnail display region 303.

The trajectory button 304 is used for executing retrieval with the movement trajectory and the like specified as the retrieval query. When the trajectory button 304 is pressed, for example, an input screen 305 for inputting the retrieval query is displayed. The input screen 305 may be displayed, for example, instead of the object display region 302 or in a superimposed manner on the object display region 302. On the input screen 305, icons and the like indicating the objects displayed in the object display region 302 are not displayed, the retrieval query such as an arrow indicating the movement trajectory and character strings indicating the object and the peripheral situation can be input on the field (two-dimensional plane).

An image that matches with the retrieval query input as described above may be displayed in the thumbnail display region 303. In the case in which the video image is input in real time, when the image that matches with the retrieval query input in advance is input, the image may be displayed in the thumbnail display region 303. When a thumbnail is selected in the thumbnail display region 303, an image corresponding to the selected thumbnail may be displayed in the reproduction region 301.

Next, specific examples of a retrieval query input method are described. FIG. 4 to FIG. 19 are diagrams illustrating an example of the retrieval query input method.

Figure 4:
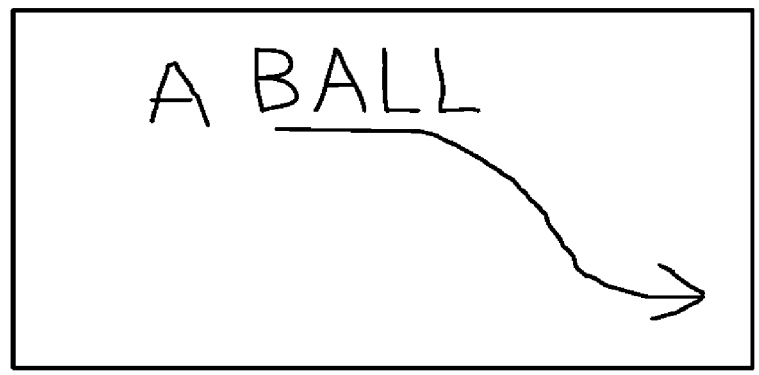
FIG. 4 is a diagram illustrating an example of a retrieval query input method.

FIG. 4 illustrates an example in which a retrieval query for retrieving a "scene with movement of a ball along a specified trajectory while team A attacks" is input. In this case, the object the movement trajectory of which is retrieved is the "ball" and the peripheral situation is a situation of "team A holds the ball".

Figure 5:
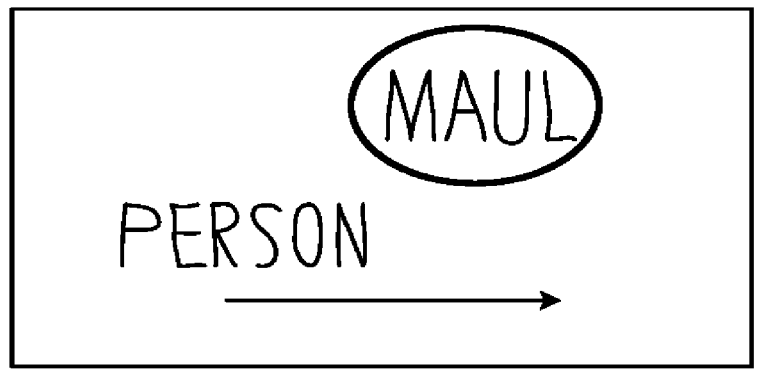
FIG. 5 is a diagram illustrating another example of the retrieval query input method.

FIG. 5 illustrates an example in which a retrieval query for retrieving a "scene with movement of a player along a specified trajectory while a maul is located at a specified position" is input. In this case, the object the movement trajectory of which is retrieved is the "person" and the peripheral situation is a situation of the "maul is located at the specified position".

Figure 6:
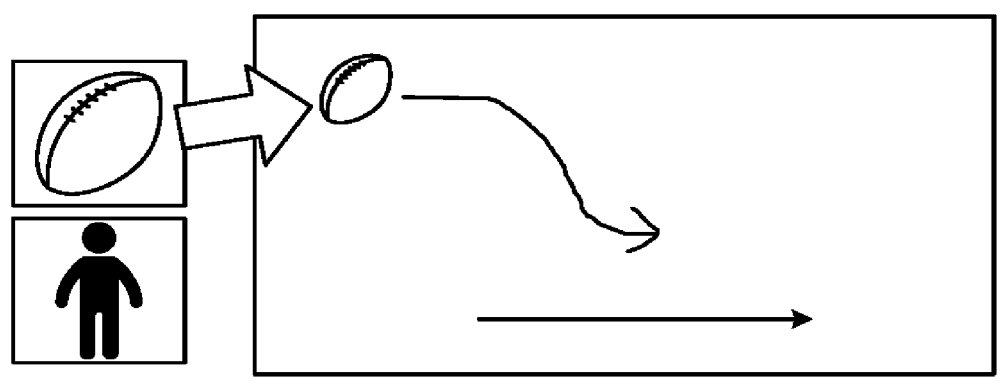
FIG. 6 is a diagram illustrating still another example of the retrieval query input method.

As a method for specifying the object and the peripheral situation, any method such as handwritten input, pen colors, icons, and buttons can be applied. FIG. 6 illustrates an example in which the object such as the "ball" and the "person" is selected with the icon and the movement trajectory is specified by handwritten input. As illustrated in a lower portion in FIG. 6, a situation indicating movement of the player (person) may be capable of being specified with an arrow. The team to which the player belongs may be capable of being specified by specifying color for the arrow. A plurality of movement trajectories may be input. That is to say, a retrieval query for retrieval with the plurality of movement trajectories may be used.

When both of the object and the peripheral situation are input by the same method, whether each input is input for specifying the object or input for specifying the peripheral situation may be determined. In the example of FIG. 4, the "ball" input to a position close to the movement trajectory may be determined to be the object and "A" input to a position that is farther from the movement trajectory relative to the "ball" may be determined to be the peripheral situation.

Retrieval may be executed with both a retrieval query indicating a combination of the "ball" as the object and the "person" as the peripheral situation and a retrieval query indicating a combination of the "person" as the object and the "ball" as the peripheral situation.

Figure 7:
FIG. 7 is a diagram illustrating still another example of the retrieval query input method.
Figure 8:
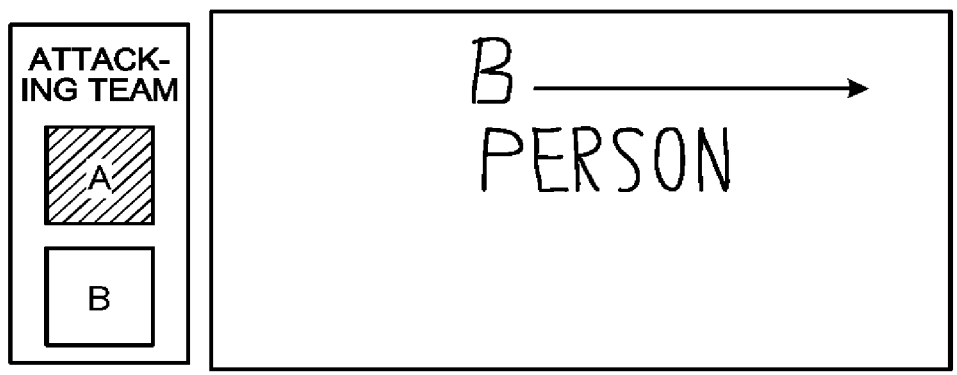
FIG. 8 is a diagram illustrating still another example of the retrieval query input method.
Figure 9:
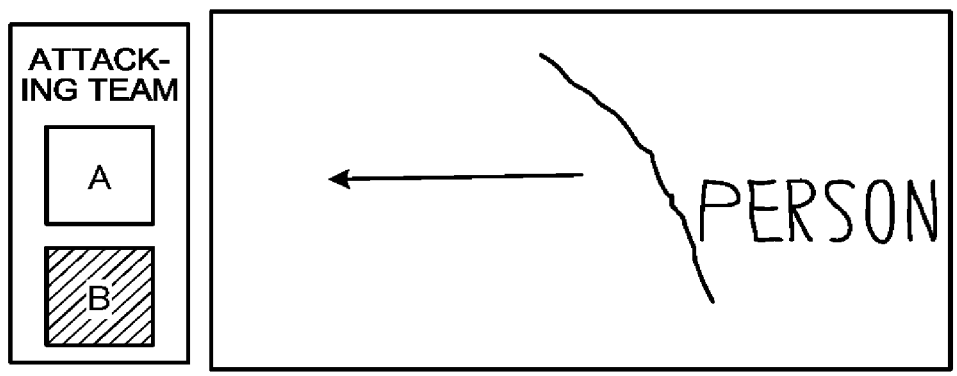
FIG. 9 is a diagram illustrating still another example of the retrieval query input method.

FIG. 7 to FIG. 9 illustrate examples of an input method where the "ball holding team" is input as the peripheral situation. FIG. 7 to FIG. 9 illustrate examples in which the "ball holding team" is selected with a button ("A" or "B"). Instead of the button, the "ball holding team" may be input by a pen color or handwriting.

FIG. 7 is an example in which a retrieval query for retrieving a "scene with movement of a ball along a specified trajectory while team A attacks" is input. In this case, the object the movement trajectory of which is retrieved is the "ball" and the peripheral situation is a situation of "team A holds the ball".

FIG. 8 is an example in which a retrieval query for retrieving a "scene with movement of a player of team B along a specified trajectory while team A attacks" is input. In this case, the object the movement trajectory of which is retrieved is the "player of team B" and the peripheral situation is a situation of "team A holds the ball".

FIG. 9 is an example in which a retrieval query for retrieving a "scene with movement of a player line along a specified trajectory while team B attacks" is input. In this case, the object the movement trajectory of which is retrieved is the "player line" and the peripheral situation is a situation of "team B holds the ball".

Figure 10:
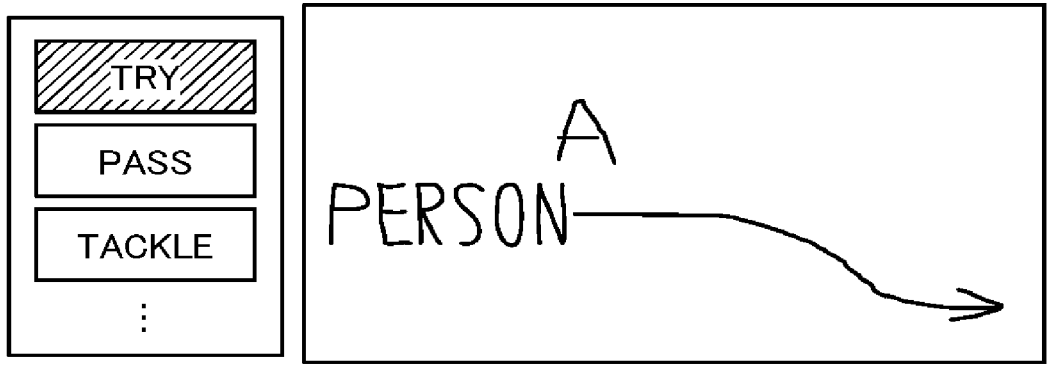
FIG. 10 is a diagram illustrating still another example of the retrieval query input method.
Figure 11:
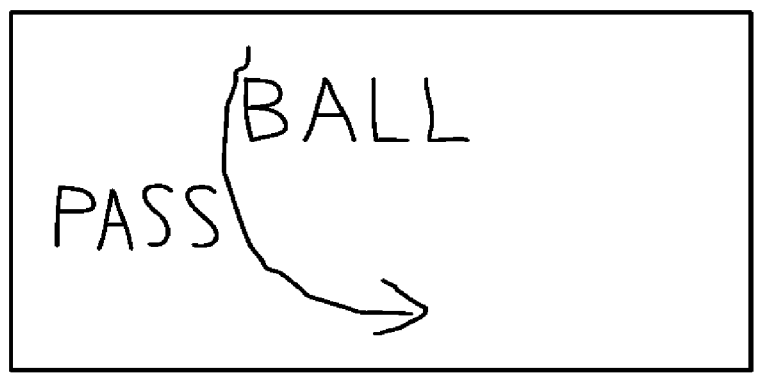
FIG. 11 is a diagram illustrating still another example of the retrieval query input method.
Figure 12:
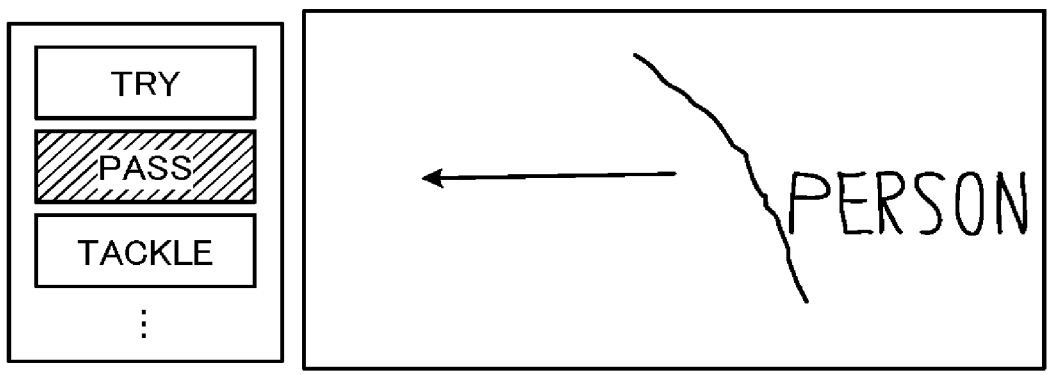
FIG. 12 is a diagram illustrating still another example of the retrieval query input method.

FIG. 10 to FIG. 12 illustrate examples of an input method where a "play type" is input as the peripheral situation. FIG. 10 to FIG. 12 illustrate examples in which the "play type" is selected with a button ("try", "pass", "tackle", and the like). Instead of the button, the "play type" may be input by a pen color or handwriting.

FIG. 10 illustrates an example in which a retrieval query for retrieving a "try scene with movement of a player of team A along a specified trajectory" is input. In this case, the object the movement trajectory of which is retrieved is the "player of team A" and the peripheral situation is a situation of "try play".

FIG. 11 illustrates an example in which a retrieval query for retrieving a "scene with movement of a ball along a specified trajectory by linkage of passes" is input. In this case, the object the movement trajectory of which is retrieved is the "ball" and the peripheral situation is a situation of the "pass play".

FIG. 12 illustrates an example in which a retrieval query for retrieving a "scene with movement of a player line along a specified trajectory in passing" is input. In this case, the object the movement trajectory of which is retrieved is the "player line" and the peripheral situation is a situation of the "pass play".

Figure 14:
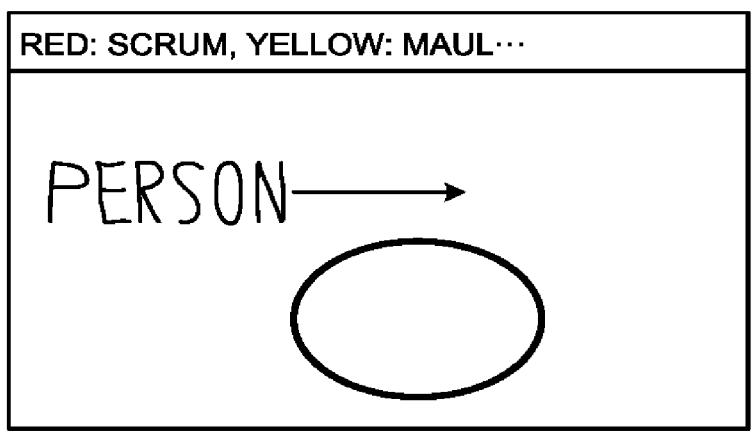
FIG. 14 is a diagram illustrating still another example of the retrieval query input method.
Figure 15:
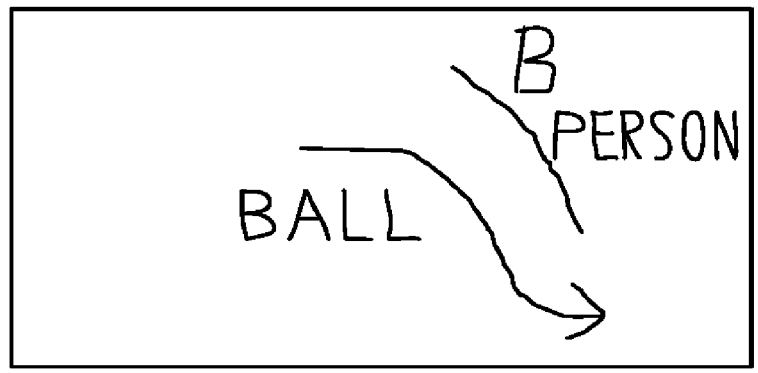
Figure 16:
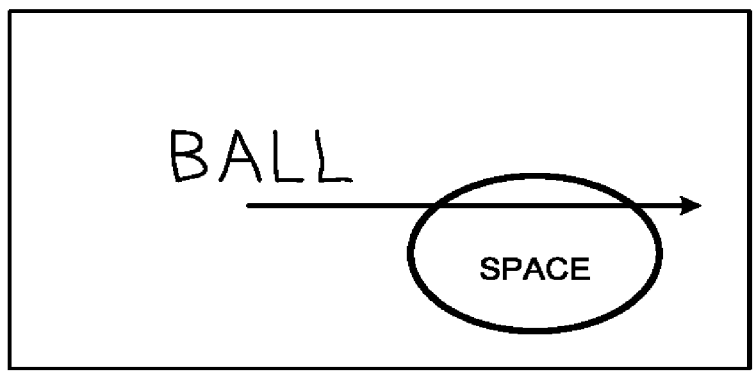
FIG. 16 is a diagram illustrating still another example of the retrieval query input method.

FIG. 13 to FIG. 16 illustrate examples of an input method where a "position of another object" is input as the peripheral situation. FIG. 13 to FIG. 16 illustrate examples in which the "position of another object" is input by a pen color or handwriting. It should be noted that as illustrated in FIG. 16, a "space" can be input as another object.

Figure 13:
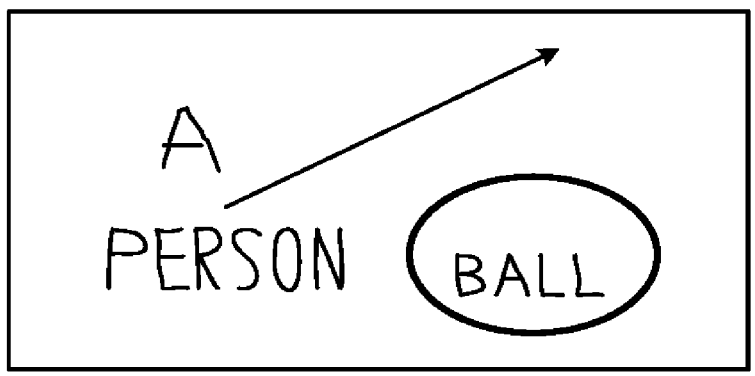
FIG. 13 is a diagram illustrating still another example of the retrieval query input method.

FIG. 13 illustrates an example in which a retrieval query for retrieving a "scene with movement of a player of team A along a specified trajectory when a ball is located at a specified position" is input. In this case, the object the movement trajectory of which is retrieved is the "player of team A" and the peripheral situation is a situation of the "ball is located at the specified position".

FIG. 14 illustrates an example in which a retrieval query for retrieving a "scene with movement of a player along a specified trajectory when a maul is located at a specified position" is input. It is assumed that a circular query in FIG. 14 is drawn with a yellow line. In this case, the object the movement trajectory of which is retrieved is "player" and the peripheral situation is a situation of the "maul is located at the specified position".

FIG. 15 illustrates an example in which a retrieval query for retrieving a "scene with movement of a ball along a specified trajectory when a player line of team B is located at a specified position" is input. In this case, the object the movement trajectory of which is retrieved is the "ball" and the peripheral situation is a situation of the "player line of team F is located at the specified position".

FIG. 16 illustrates an example in which a retrieval query for retrieving a "scene with movement of a ball along a specified trajectory when a space is located at a specified position" is input. In this case, the object the movement trajectory of which is retrieved is the "ball" and the peripheral situation is a situation of the "space is located at the specified position".

Figure 17:
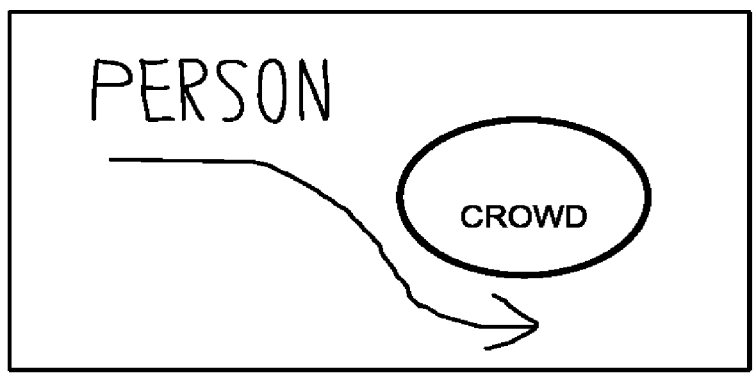
FIG. 17 is a diagram illustrating still another example of the retrieval query input method.
Figure 18:
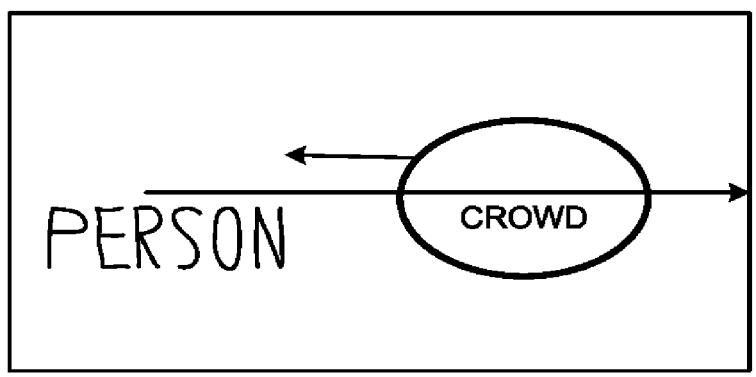
FIG. 18 is a diagram illustrating still another example of the retrieval query input method.
Figure 19:
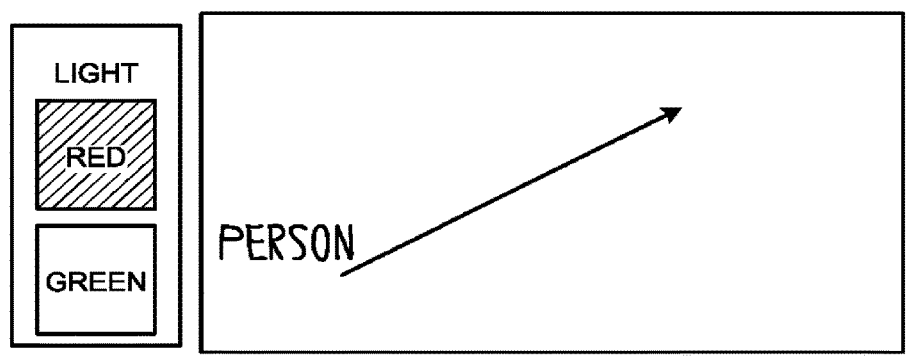
FIG. 19 is a diagram illustrating still another example of the retrieval query input method.

FIG. 17 to FIG. 19 illustrate examples of the input method when it is applied to analysis of a video image other than a video image of a sport. FIG. 17 to FIG. 19 illustrate examples when the flow of a person in the video image is analyzed.

FIG. 17 illustrates an example in which a retrieval query for retrieving a "scene of avoidance of a person along a specified trajectory when there is a crowd at a specified position" is input. In this case, the object the movement trajectory of which is retrieved is the "person" and the peripheral situation is a situation of the "crowd is at the specified position".

FIG. 18 illustrates an example in which a retrieval query for retrieving a "scene of movement of a person in the reverse direction to the flow direction of a crowd" is input. In this case, the object the movement trajectory of which is retrieved is the "person" and the peripheral situation is a situation of the "crowd is located at the specified position and moves in the specified direction".

FIG. 19 illustrates an example in which a retrieval query for retrieving a "scene of oblique crossing of a person in a red light" is input. In this case, the object the movement trajectory of which is retrieved is the "person" and the peripheral situation is a situation of the "red light". The peripheral situation may be specified by a sound situation of, for example, "generation of a signal switching sound". In t case, it is sufficient that the situation estimation unit 103 estimates situation of ambient sound of the object from sound contained in the video image, for example.

Figure 20:
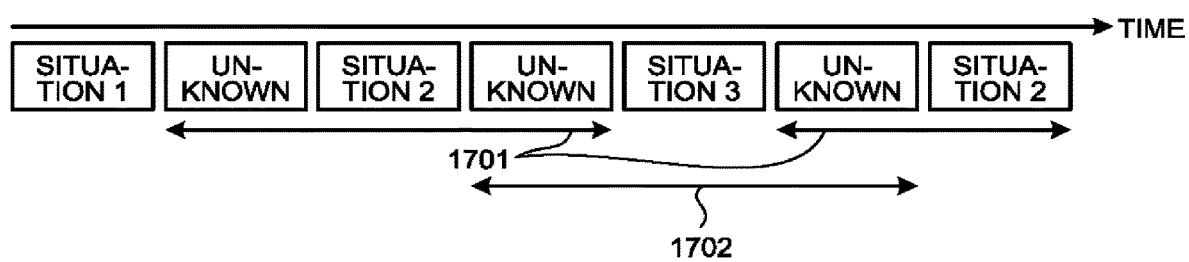
FIG. 20 is a diagram for explaining an example of a peripheral situation matching method.

FIG. 20 is a diagram for explaining an example of a peripheral situation matching method. As mentioned above, it is estimated that the peripheral situation of the object is unknown in some cases. In this case, the retrieval unit 107 may retrieve an image having the matching movement trajectory from images including an image having the matching peripheral situation and at least one of images before or after the image in the range.

When, for example, the retrieval query contains a "situation 2" as the peripheral situation, the retrieval unit 107 retrieves an image having the matching movement trajectory from a range 1701 containing the situations of "unknown" before and after the situation 2. When, for example, the retrieval query contains a "situation 3" as the peripheral situation, the retrieval unit 107 retrieves an image having the matching movement trajectory from a range 1702 containing the situations of "unknown" before and after the situation 3.

As described above, according to the embodiment, a desired image can be retrieved from the time-series images using, as the retrieval query, the movement trajectory of the target and the peripheral situation of the target. With this, the desired image can be retrieved more appropriately.

Figure 21:
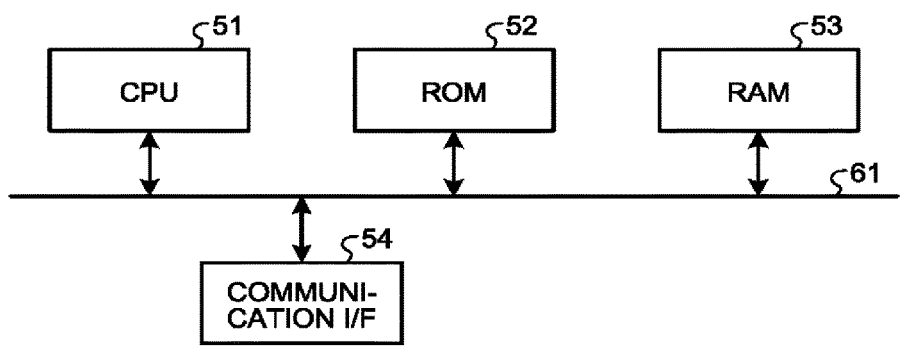
FIG. 21 is a diagram illustrating the hardware configuration of the retrieval device.

Next, the hardware configuration of the retrieval device according to the embodiment will be described with reference to FIG. 21. FIG. 21 is a descriptive diagram for explaining an example of the hardware configuration of the retrieval device according to the embodiment.

The retrieval device according to the embodiment includes a control device such as a central processing unit (CPU) 51, storage devices such as a read only memory (ROM) 52 and a random access memory (RAM) 53, a communication interface (I/F) 54 connected to a network for communication, and a bus 61 connecting respective units.

The computer program that is executed by the retrieval device according to the embodiment is embedded and provided in the ROM 52 or the like.

The computer program that is executed by the retrieval device according to the embodiment may be recorded and provided as a computer program product on a computer-readable recording medium such as a compact disc read only memory ROM), a flexible disk (FD), a compact disc recordable (CD-R), and a digital versatile disc (DVD), as an installable or executable file.

The computer program that is executed by the retrieval device according to the embodiment may be stored in a computer connected to a network such as the Internet and provided by being downloaded via the network. Furthermore, the computer program that is executed by the retrieval device according to the embodiment may be provided or distributed via a network such as the Internet.

The computer program that is executed by the retrieval device according to the embodiment can cause a computer to function as the respective units of the above-mentioned retrieval device. The computer can execute the computer program by reading, by the CPU 51, on a main storage device from the computer-readable storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A retrieval device comprising:
a memory; and
one or more processors configured to:
   acquire trajectory information indicating a movement trajectory of a target in time-series images;
   acquire situation information indicating a sound environment corresponding to the time-series images, the sound environment being recognized by analyzing sound contained in the time-series images or sound acquired independently of the time-series images;
   acquire a retrieval query from an input device comprising a microphone, the retrieval query containing a movement trajectory and a peripheral situation, the retrieval query concerning the peripheral situation being input via a sound from the microphone; and
   retrieve an image matching with the movement trajectory contained in the retrieval query and matching with the peripheral situation contained in the retrieval query among images contained in the time-series images, wherein
the peripheral situation is matched by comparing the sound input of the retrieval query and the sound contained in the time-series images with each other.

2. The retrieval device according to claim 1, wherein the one or more processors retrieves first images among the images contained in the time-series images, and retrieves, from the first images, an image of which the trajectory information matches with the movement trajectory contained in the retrieval query, pieces of the situation information of the first images matching with the peripheral situation contained in the retrieval query.

3. The retrieval device according to claim 2, wherein
the situation information includes information indicating that the peripheral situation of the target is unknown, and
the one or more processors retrieves, from the first images and at least one of images before or after each of the first images, an image of which the trajectory information matches with the movement trajectory contained in the retrieval query, the situation information of the at least one of images indicating that the peripheral situation of the target is unknown.

4. The retrieval device according to claim 1, wherein
the one or more processors further configured to
detect a position of the target from the time-series images; and
estimate the movement trajectory based on the detected position, and
the one or more processors acquires the trajectory information indicating the estimated movement trajectory.

5. The retrieval device according to claim 1, wherein
the one or more processors further configured to estimate the peripheral situation from the time-series images, and
the one or more processors acquires the situation information indicating the estimated peripheral situation.

6. The retrieval device according to claim 5, wherein when a peripheral situation of a second image contained in the time-series images is unknown, the one or more processors estimates that a peripheral situation of the second image is the peripheral situation of at least one of images before or after the second image.

7. The retrieval device according to claim 1, wherein the target includes at least one of a person, a gathering of a plurality of persons, or a region in which a plurality of persons gather.

8. A retrieval method comprising:
acquiring trajectory information indicating a movement trajectory of a target in tin series images;
acquiring situation information indicating a peripheral situation of the target in the time-series images, the peripheral situation indicating a sound environment corresponding to the time-series images; the sound environment being recognized by analyzing sound contained in the time-series images or sound acquired independently of the time-series images;
acquiring a retrieval query from an input device comprising a microphone, the retrieval query containing a movement trajectory and a peripheral situation, the retrieval query concerning the peripheral situation being input via a sound from the microphone; and
retrieving an image matching with the movement trajectory contained in the retrieval query and matching with the peripheral situation contained in the retrieval query among images contained in the time-series images, wherein
the peripheral situation is matched by comparing the sound input of the retrieval query and the sound contained in the time-series images with each other.

9. The retrieval method according to claim 8, wherein the retrieving includes retrieving first images among the images contained in the time-series images, and retrieving, from the first images, an image of which the trajectory information matches with the movement trajectory contained in the retrieval query, pieces of the situation information of the first images matching with the peripheral situation contained in the retrieval query.

10. The retrieval method according to claim 9, wherein
the situation information includes information indicating that the peripheral situation of the target is unknown, and
the retrieving includes retrieving, from the first images and at least one of images before or after each of the first images, an image of which the trajectory information matches with the movement trajectory contained in the retrieval query, the situation information of the at least one of images indicating that the peripheral situation of the target is unknown.

11. The retrieval method according to claim 8, further comprising:
detecting a position of the target from the time-series images; and
estimating the movement trajectory based on the detected position, wherein
the trajectory information indicating the estimated movement trajectory is acquired.

12. The retrieval method according to claim 8, further catyrising:
estimating the peripheral situation from the time-series images, wherein
the situation information indicating the estimated peripheral situation is acquired.

13. The retrieval method according to claim 12, wherein the estimating includes, when a peripheral situation of a second image contained in the time-series images is unknown, estimating that a peripheral situation of the second image is the peripheral situation at least one of images before or after of the second image.

14. The retrieval method according to claim 8, wherein the target includes at least one of a person, a gathering of a plurality of persons, or a region in which a plurality of persons gather.

15. A computer program product having a non-transitory computer readable medium comprising instructions that cause a computer to execute:
acquiring trajectory information indicating a movement trajectory of a target in time-series images;
acquiring situation information indicating a peripheral situation of the target in the time-series images, the peripheral situation indicating a sound environment corresponding to the time-series images, the sound environment being recognized by analyzing sound contained in the time-series images or sound acquired independently of the time-series images;
acquiring a retrieval query from an input device comprising a microphone, the retrieval query containing a movement trajectory and a peripheral situation, the retrieval query concerning the peripheral situation being input via a sound from the microphone; and
retrieving an image matching with the movement trajectory contained in the retrieval query and matching with the peripheral situation contained in the retrieval query among images contained in the time-series images, wherein
the peripheral situation is matched by comparing the sound input of the retrieval query and the sound contained in the time-series images with each other.

16. The computer program product according to claim 15, wherein the retrieving includes retrieving first images among the images contained in the time-series images, and retrieves from the first images, an image of which the trajectory information matches with the movement trajectory contained in the retrieval query, pieces of the situation information of the first images matching with the peripheral situation contained in the retrieval query.

* * * * *